(12) United States Patent
Tsai et al.

(10) Patent No.: US 10,212,074 B2
(45) Date of Patent: *Feb. 19, 2019

(54) LEVEL OF HIERARCHY IN MST FOR TRAFFIC LOCALIZATION AND LOAD BALANCING

(71) Applicant: Cisco Technology, Inc., San Jose, CA (US)

(72) Inventors: Chia Tsai, Cupertino, CA (US); Norman W. Finn, Livermore, CA (US); Yibin Yang, San Jose, CA (US); Debashis Patnala Rao, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,503

(22) Filed: Jul. 28, 2017

(65) Prior Publication Data

US 2017/0331730 A1 Nov. 16, 2017

Related U.S. Application Data

(63) Continuation of application No. 13/168,571, filed on Jun. 24, 2011, now Pat. No. 9,736,065.

(51) Int. Cl.
*H04L 12/753* (2013.01)
*H04L 12/715* (2013.01)
(Continued)

(52) U.S. Cl.
CPC .............. *H04L 45/48* (2013.01); *H04L 45/04* (2013.01); *H04L 45/24* (2013.01); *H04L 45/46* (2013.01); *H04L 47/125* (2013.01)

(58) Field of Classification Search
None
See application file for complete search history.

(56) References Cited

U.S. PATENT DOCUMENTS

| 5,812,773 A | 9/1998 | Norin |
| 5,889,896 A | 3/1999 | Meshinsky et al. |

(Continued)

FOREIGN PATENT DOCUMENTS

| CN | 101719930 | 6/2010 |
| CN | 101394360 | 7/2011 |

(Continued)

OTHER PUBLICATIONS

Author Unknown, "Understanding Multiple Spanning Tree Protocol (802.1s)," Document ID: 24248, Cisco Systems, Inc., Apr. 17, 2007, 13 pages.

(Continued)

*Primary Examiner* — Khaled M Kassim
(74) *Attorney, Agent, or Firm* — Polsinelli PC

(57) ABSTRACT

In one embodiment, a multiple spanning tree (MST) region is defined in a network, where the MST region includes a plurality of network nodes interconnected by links. A MST cluster is defined within the MST region, where the MST cluster includes a plurality of network nodes selected from the plurality of network nodes of the MST region. A network node of the MST cluster generates one or more MST bridge protocol data units (BPDUs) that present the MST cluster as a single logical entity to network nodes of the MST region that are not included in the MST cluster, yet enables per-multiple spanning tree instance (per-MSTI) load balancing of traffic across inter-cluster links that connect network nodes included in the MST cluster and network nodes of the MST region that are not included in the MST cluster.

20 Claims, 6 Drawing Sheets

(51) Int. Cl.
*H04L 12/707* (2013.01)
*H04L 12/803* (2013.01)

(56) References Cited

U.S. PATENT DOCUMENTS

| | | | |
|---|---|---|---|
| 6,049,797 A * | 4/2000 | Guha | G06F 17/30598 |
| 6,108,782 A | 8/2000 | Fletcher et al. | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,813,250 B1 | 11/2004 | Fine et al. | |
| 6,996,615 B1 | 2/2006 | McGuire | |
| 7,054,930 B1 | 5/2006 | Cheriton | |
| 7,058,706 B1 | 6/2006 | Lyer et al. | |
| 7,062,571 B1 | 6/2006 | Dale et al. | |
| 7,111,177 B1 | 9/2006 | Chauvel et al. | |
| 7,212,490 B1 | 5/2007 | Kao et al. | |
| 7,277,948 B2 | 10/2007 | Igarashi et al. | |
| 7,292,581 B2 | 11/2007 | Finn | |
| 7,313,667 B1 | 12/2007 | Pullela et al. | |
| 7,379,846 B1 | 5/2008 | Williams et al. | |
| 7,480,258 B1 | 1/2009 | Shuen et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,583,665 B1 | 9/2009 | Duncan et al. | |
| 7,606,147 B2 | 10/2009 | Luft et al. | |
| 7,644,437 B2 | 1/2010 | Volpano | |
| 7,647,594 B2 | 1/2010 | Togawa | |
| 7,706,364 B2 | 4/2010 | Smith et al. | |
| 7,729,296 B1 * | 6/2010 | Choudhary | H04L 12/4625 370/256 |
| 7,760,668 B1 * | 7/2010 | Zinjuvadia | H04L 12/462 370/256 |
| 7,773,510 B2 | 8/2010 | Back et al. | |
| 7,808,897 B1 | 10/2010 | Mehta et al. | |
| 7,821,972 B1 | 10/2010 | Finn et al. | |
| 7,835,306 B2 | 11/2010 | Tallet | |
| 7,881,957 B1 | 2/2011 | Cohen et al. | |
| 7,889,681 B2 | 2/2011 | Finn | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,356 B2 | 7/2013 | Ashok et al. | |
| 8,495,725 B2 | 7/2013 | Ahn | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andries et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,850,002 B1 | 9/2014 | Dickinson et al. | |
| 8,850,182 B1 | 9/2014 | Fritz et al. | |
| 8,856,339 B2 | 10/2014 | Mestery et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,130,846 B1 | 9/2015 | Szabo et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,294,408 B1 | 3/2016 | Dickinson et al. | |
| 9,313,048 B2 | 4/2016 | Chang et al. | |
| 9,361,192 B2 | 6/2016 | Smith et al. | |
| 9,379,982 B1 | 6/2016 | Krishna et al. | |
| 9,380,075 B2 | 6/2016 | He et al. | |
| 9,432,245 B1 | 8/2016 | Sorenson, III et al. | |
| 9,432,294 B1 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,571,570 B1 | 2/2017 | Mutnuru | |
| 9,613,078 B2 | 4/2017 | Vermeulen et al. | |
| 9,628,471 B1 | 4/2017 | Sundaram et al. | |
| 9,658,876 B2 | 5/2017 | Chang et al. | |
| 9,692,802 B2 | 6/2017 | Bicket et al. | |
| 9,736,065 B2 | 8/2017 | Tsai et al. | |
| 9,755,858 B2 | 9/2017 | Bagepalli et al. | |
| 2001/0055303 A1 | 12/2001 | Horton et al. | |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |
| 2003/0228585 A1 | 12/2003 | Inoko et al. | |
| 2004/0004941 A1 | 1/2004 | Malan et al. | |
| 2004/0034702 A1 | 2/2004 | He | |
| 2004/0081171 A1 * | 4/2004 | Finn | H04L 12/462 370/395.53 |
| 2004/0088542 A1 | 5/2004 | Daude et al. | |
| 2004/0095237 A1 | 5/2004 | Chen et al. | |
| 2004/0131059 A1 | 7/2004 | Ayyakad et al. | |
| 2004/0197079 A1 | 10/2004 | Latvala et al. | |
| 2004/0264481 A1 | 12/2004 | Darling et al. | |
| 2005/0060418 A1 | 3/2005 | Sorokopud | |
| 2005/0125424 A1 | 6/2005 | Herriott et al. | |
| 2005/0259597 A1 | 11/2005 | Benedetto et al. | |
| 2006/0007939 A1 * | 1/2006 | Elangovan | H04L 12/465 370/395.53 |
| 2006/0062187 A1 | 3/2006 | Rune | |
| 2006/0104286 A1 | 5/2006 | Cheriton | |
| 2006/0126665 A1 | 6/2006 | Ward et al. | |

(56) References Cited

U.S. PATENT DOCUMENTS

| | | |
|---|---|---|
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0064628 A1* | 3/2007 | Tallet ................. H04L 45/00 370/256 |
| 2007/0140147 A1* | 6/2007 | Touve ................. H04L 12/4641 370/255 |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2007/0258390 A1 | 11/2007 | Khan et al. |
| 2007/0263640 A1* | 11/2007 | Finn ................. H04L 47/10 370/401 |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165704 A1* | 7/2008 | Marchetti ........... H04L 12/4641 370/256 |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0059800 A1* | 3/2009 | Mohan ................. H04L 12/462 370/241.1 |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0040070 A1* | 2/2010 | Suh ................. H04L 45/00 370/400 |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0118740 A1* | 5/2010 | Takacs ................. H04L 12/462 370/256 |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0097001 A1* | 4/2011 | Labbi ................. G06K 9/6219 382/225 |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0128892 A1* | 6/2011 | Tallet ................. H04L 12/462 370/256 |
| 2011/0131302 A1* | 6/2011 | Bulusu ................. H04L 12/462 709/221 |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0086403 A1* | 4/2013 | Jenne ................. G06F 1/3278 713/324 |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |

(56) References Cited

U.S. PATENT DOCUMENTS

| | | |
|---|---|---|
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254356 A1* | 9/2013 | Eastlake, III ........... H04L 45/74 709/220 |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |

(56) References Cited

U.S. PATENT DOCUMENTS

| | | | |
|---|---|---|---|
| 2017/0147297 | A1 | 5/2017 | Krishnamurthy et al. |
| 2017/0149878 | A1 | 5/2017 | Mutnuru |
| 2017/0163531 | A1 | 6/2017 | Kumar et al. |
| 2017/0171158 | A1 | 6/2017 | Hoy et al. |
| 2017/0264663 | A1 | 9/2017 | Bicket et al. |
| 2017/0339070 | A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "IEEE Standard for Information technology. Part 3: Media Access Control (MAC) Bridges," ANSI/IEEE Std 802.1D, 1998 Edition, 373 pages.
Author Unknown, "IEEE Standard for Local and metropolitan area networks, Virtual Bridged Local Area Networks," IEEE Std 802.10-2005, May 19, 2006, 303 pages.
Seaman, Mick, "Spanning Vines," Rev. 0.1, Mar. 5, 2002, 6 pages.
Amedro, Brian, et al., "An Efficient Framework for Running Applications on Clusters, Grids and Cloud," 2010, 17 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.

Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.ora/web/20070120205111/http://download.openvz.ora/doc/openvz-intro.pdf.
Kumar, S., et al., "Infrastructure Service Forwarding for NSH,"Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.

(56) References Cited

OTHER PUBLICATIONS

Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

LEVEL OF HIERARCHY IN MST FOR TRAFFIC LOCALIZATION AND LOAD BALANCING

RELATED APPLICATION

This application is a continuation of U.S. patent application Ser. No. 13/168,571 filed on Jun. 24, 2011, the contents of which is incorporated by reference in its entirety.

TECHNICAL FIELD

The present disclosure relates generally to computer networks, and, more particularly, to multiple spanning tree protocols.

BACKGROUND

IEEE Std. 802.1Q-2005 multiple spanning tree protocol (MSTP) is widely used in computer networks. With IEEE Std. 802.1Q-2005 MSTP, a bridged network may be organized into multiple spanning tree (MST) regions. Frames originating at one network node inside of a MST region, and destined for another network node of the same MST region, are contained inside the MST region. From the point of view of nodes outside of the MST region, MST regions appear as a single logical entity (specifically, a single virtual bridge). As a result of this, load balancing of traffic is typically not available across the boundaries of MST regions. Even if there are multiple links that interconnect a MST is region with external nodes, only a single link generally may be utilized. This limitation of MST regions has proved problematic in certain network configurations. Sometimes it may be desirable to contain traffic among a particular set of network nodes and present them a single logical entity to external nodes, and also enable load balancing between the group of network nodes and external nodes. However, this is currently not possible using IEEE Std. 802.1Q-2005 MSTP.

BRIEF DESCRIPTION OF THE DRAWINGS

The embodiments described herein may be better understood by referring to the accompanying drawings in which like reference numerals indicate identically or functionally similar elements, of which.

DESCRIPTION OF EXAMPLE EMBODIMENTS

Overview

Figure 1:
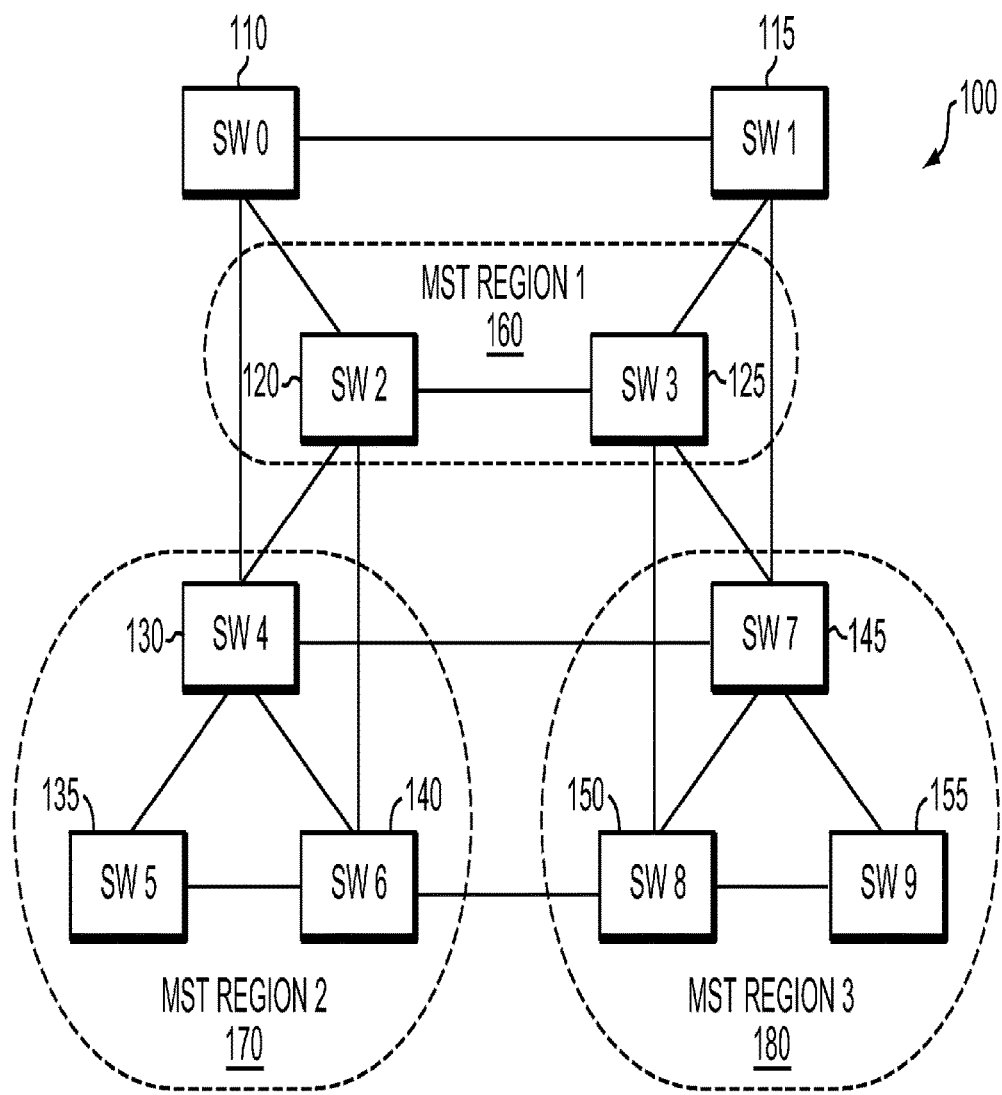
FIG. 1 is a schematic block diagram of an example computer network comprising a plurality of network nodes interconnected by links.

According to embodiments of the disclosure, an additional level of hierarchy introduced to a multiple spanning tree (MST) environment. A MST region is defined in the network, where the MST region includes a plurality of network nodes interconnected by links. A MST cluster is defined within the MST region, where the MST cluster includes a plurality of network nodes selected from the plurality of network nodes of the MST region. A network node of the MST cluster generates one or more MST bridge protocol data units (BPDUs) that present the MST cluster as a single logical entity to network nodes of the MST region that are not included in the MST cluster, yet enable per-multiple spanning tree instance (per-MSTI) load balancing of traffic across inter-cluster links.

Example Embodiments

A computer network is a geographically distributed collection of nodes, such as bridges and switches, interconnected by communication links used to transport data between the nodes. Many types of computer networks are available, with the types ranging from local area networks (LANs) to wide area networks (WANs). The nodes typically communicate by exchanging discrete packets or messages of data according to pre-defined protocols. In this context, a protocol consists of a set of rules defining how the nodes interact with each other.

Most computer networks include redundant links so that a failure of any given link does not isolate any portion of the network. The existence of redundant links, however, may cause the formation of circuitous paths or "loops." Loops are highly undesirable because data frames may traverse the loops indefinitely.

To avoid the formation of loops, most bridges and switches execute a spanning tree protocol which allows them to calculate an active network topology that is loop-free (i.e., a tree) and yet connects every node within the network (i.e., the tree is spanning). A basic spanning tree protocol, whose operation is illustrative of the class or protocols is IEEE Std. 802.1D-1998 spanning tree protocol (STP). In general, by executing IEEE Std. 802.1D-1998 STP, nodes elect a single node within the network to be the "Root." For each LAN coupled to any node, exactly one port (the "Designated Port") on one node (the "Designated Bridge") is elected. The Designated Bridge is typically the one closest to the Root. All ports on the Root are Designated Ports.

Each non-Root also selects one port from among its non-Designated Ports (its "Root Port") which gives the lowest cost path to the Root. The Root Ports and Designated Ports are selected for inclusion in the active topology and are placed in a forwarding state so that data frames may be forwarded to and from these ports. Ports not included within the active topology are placed in a blocking state. When a port is in the blocking state, data frames will not be forwarded to, or received from, the port. A network administrator may also exclude a port from the spanning tree by placing it in a disabled state.

To obtain the information necessary to run IEEE Std. 802.1D-1998 STP, nodes exchange special messages called bridge protocol data unit (BPDU) messages or simply BPDUs. BPDUs carry information, such as assumed root and lowest root path cost, used in computing the active topology.

In addition to IEEE Std. 802.1D-1998 STP, a variety of more advanced spanning tree protocols have been developed, that implement various refinements, optimizations, and extensions to the operation of IEEE Std. 802.1D-1998 STP. One such protocol is IEEE Std. 802.1Q-2005 multiple spanning tree protocol (MSTP). IEEE Std. 802.1Q-2005 MSTP organizes a bridged network into multiple spanning tree (MST) regions. Within each MST region, an internal spanning tree (IST) is established which provides connectivity to all nodes within the respective region, and to the ISTs established within other regions. The IST established within each MST region also provides connectivity to one common spanning tree (CST) established outside of the MST regions. The IST of a given MST region receives and sends BPDUs to the CST. Accordingly, all bridges of the bridged network are connected by a single Common and Internal Spanning Tree (CIST). From the point of view of outside devices, each MST region appears as a single logical entity, specifically, a single virtual bridge.

Within each MST region, IEEE Std. 802.1Q-2005 MSTP establishes a plurality of active topologies, each of which is called a multiple spanning tree instance (MSTI). Virtual LANs (VLANs) are assigned or mapped to the MSTIs. Because VLANs may be assigned to different MSTIs, frames associated with different VLANs can take different paths through a MST region. Each MSTI is basically a spanning tree that exists only inside the respective MST region, and the MSTIs do not interact outside of the MST region. Frames originating at one network node inside of a MST region and destined for another network node of the same MST region, follow a corresponding MSTI to reach their destination. Such internal traffic is contained inside the MST region, and is not allowed to, for example, leave the MST region, take external links, and then renter the MST region, as this may lead to the formation of loops.

IEEE Std. 802.1Q-2005 MSTP uses BPDUs to establish the ISTs and MSTIs, as well as to define the boundaries of the different MST regions. Unlike some other protocols, the bridges do not send separate BPDUs for each MSTI. Instead, every BPDU carries the information needed to compute the active topology for all of the MSTIs defined within the respective MST region.

As discussed above, from the point of view of external node, each MST region appears as a single logical entity (specifically, a single virtual bridge). As a result of this, load balancing of traffic is typically not available across boundaries of MST regions. Even if there are multiple links that interconnect a MST region with external nodes, only a single link generally may be utilized. This limitation of MST regions has proved problematic in certain network configurations. Sometimes it may be desirable to contain traffic among a particular set of network nodes and present them a single logical entity to external nodes, and also enable load balancing between the group of network nodes and external nodes. However, this is currently not possible using IEEE Std. 802.1Q-2005 MSTP.

FIG. 1 is a schematic block diagram of an example computer network 100 comprising a plurality of network nodes 110-155 (e.g., bridges or switches) interconnected by links, which illustrate some of the above discussed issues. The nodes 110-155 are interconnected by a plurality of links, referred to herein by reference to the names of the nodes at the opposing ends of the links (e.g., link sw0-sw1 being the link connecting network node sw0 110 to network node sw1 115, link sw0-sw2 being the link connecting network node sw0 100 to network node sw2 120, etc.). Suppose it is desired for nodes sw4 130, sw5 135 and sw6 140 to present themselves to external nodes as a single logical entity, and to contain internal traffic among themselves. Further, suppose it is also desired that nodes sw7 145, sw8 150 and sw9 155 present themselves as a single logical entity and contain internal traffic among themselves, and, additionally, that nodes sw2 120 and sw3 125 present themselves as a single logical entity and contain internal traffic among themselves. One could establish three MST regions: Region 1 160 encompassing nodes sw2 120 and sw3 125; Region 2 170 encompassing nodes sw4 130, sw5 135, and sw6 140; and Region 3 180 encompassing nodes sw7 145, sw8 150, and sw9 155. The establishment of such MST regions may effectively contain internal traffic. However, load balancing may not be enabled across the boundaries of the three MST regions, as each of the MST regions would appear as single virtual bridge on the CST. For example, all traffic between Region 1 160 and Region 2 170 would be allowed only to travel on a single link (e.g., link sw2-sw4) selected for inclusion in the CST, while other redundant links (e.g., link sw2-sw6) would not be used. Accordingly, available network bandwidth may not be efficiently utilized.

Figure 2:
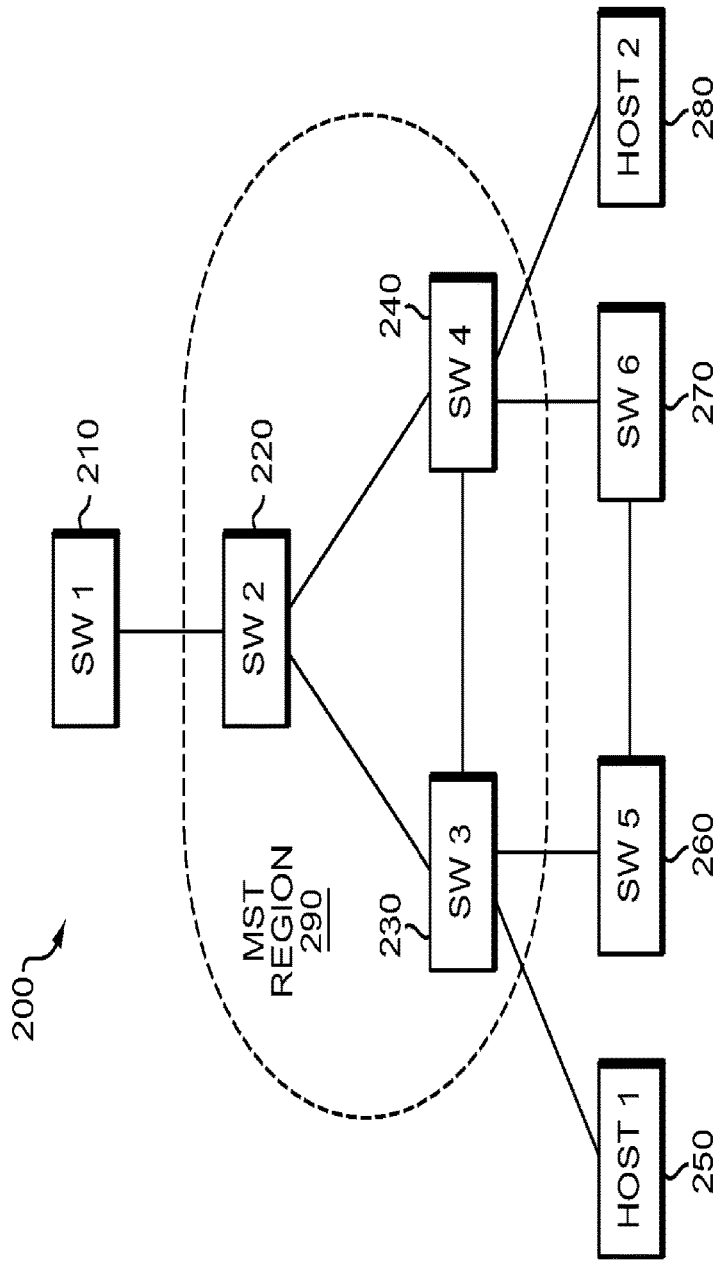
FIG. 2 is a schematic block diagram of an example computer network that includes a plurality of network nodes, some of which are members of a master-satellite switching configuration.

Network configurations similar to that shown in FIG. 1, with their corresponding issues, may arise in a variety of settings. For example, the setting may involve a master-satellite switching configuration. FIG. 2 is a schematic block diagram of an example computer network 200 that includes a plurality of network nodes 210-280, some of which (i.e. nodes sw2 220, sw3 230 and sw4 240) are members of a master-satellite switching configuration. Master node sw2 220 is connected to satellite nodes sw3 230 and sw4 240. To present Master node sw2 220 and satellite nodes sw3 230 and sw4 240 as a single logical entity, and contain internal traffic among them, one may place such nodes within a MST region, i.e., Region 290. Use of such a MST region, for example, may prevent traffic received from host 1 250 and destined for host 2 280, from being directed along a path from satellite node sw3 230, to node sw5 260, to node sw6 270, and then back to node sw4 240, to reach host 2 280, rather than utilize the sw3-sw4 link. However, use of such a MST region may also prevent load balancing across links to external nodes, for example, across links sw3-sw5 and sw4-sw6, due to the MST region appearing to external nodes as a single virtual bridge.

Similarly, the above discussed issues may arise in the context of a multi-chassis virtual switching system (VSS) using MST in conjunction with virtual switch links (VSLs), or in the context of a data center, using MST among backbone or "top-of-the rack" devices. In these example scenarios as well, it may be desirable to both contain traffic among a particular set of nodes, and cause the group of nodes to externally present as a single logical entity, while also enabling load balancing between the group of nodes and external nodes. Accordingly, there is a need for a technique that can achieve these formerly mutually exclusive goals within a MST environment.

MST Clusters

According to embodiments of the present disclosure, an additional level of hierarchy, referred to herein as a "MST cluster", is defined within a MST environment. A MST cluster includes a set of nodes selected from the nodes of a MST region. The group of nodes selected for inclusion in a MST cluster may be a group of nodes for which traffic containment is desired. The cluster is presented within BPDUs as a single logical entity. Internal traffic that is sourced and destined for network nodes of the MST cluster is contained within the MST cluster, and passed over "intra-cluster links", i.e. links that couple nodes located within the MST cluster.

Unlike a MST region, load balancing is enabled across the boundary of a MST cluster. Since nodes within the MST cluster and the rest of the MST region may have consistent MST configurations (i.e., share the same MST region name, revision number and MST configuration table), per-MSTI load balancing may occur across the boundary of the MST cluster. In this manner, external traffic that is sourced from, or destined for, nodes of the MST region located external to MST cluster may be load balanced across "inter-cluster links", i.e. links that couple nodes located within the MST cluster with nodes located external to the MST cluster that are within the MST region.

Figure 3:
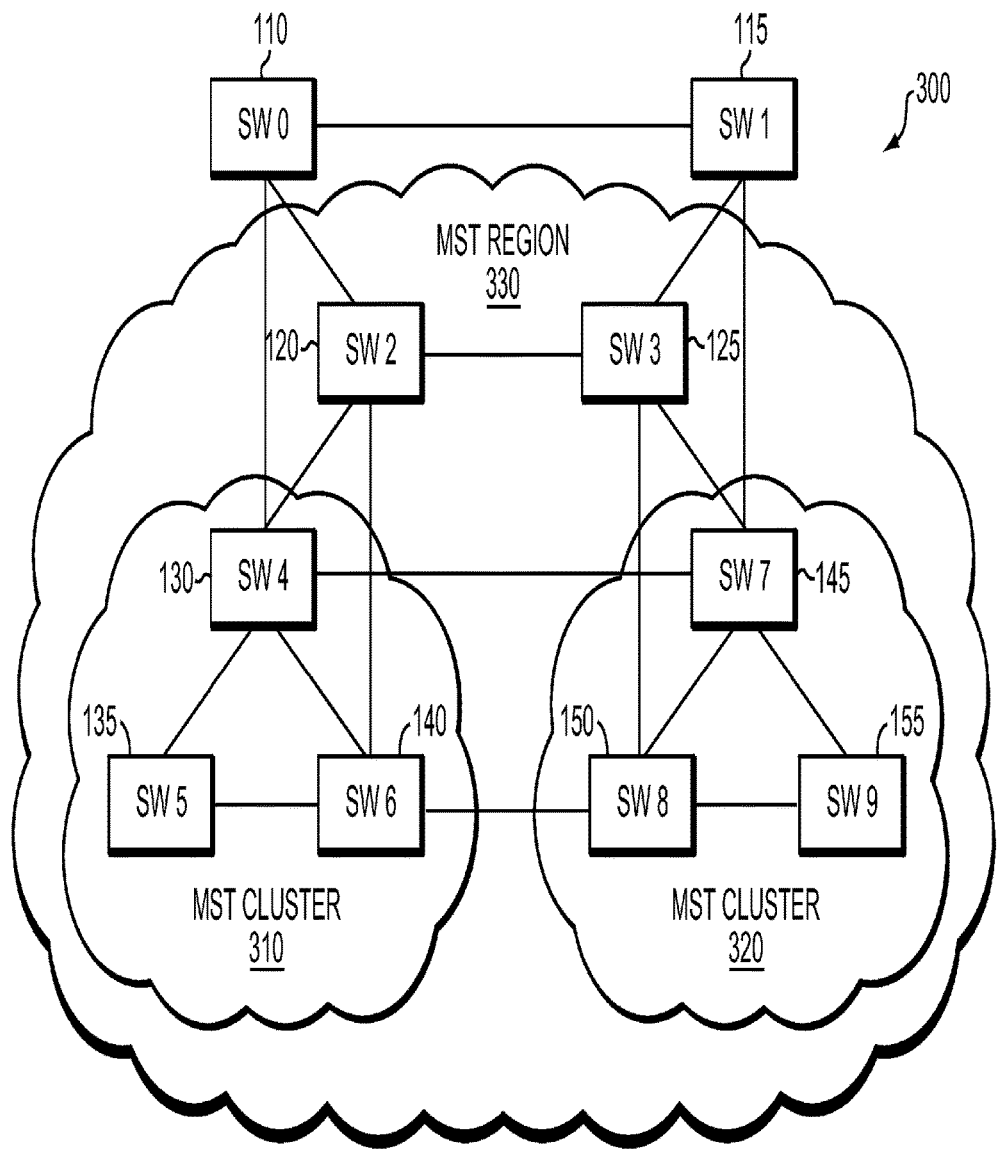
FIG. 3 is a schematic block diagram of the example computer network of FIG. 1 in which first and second MST clusters have been established with a MST region.

FIG. 3 is a schematic block diagram of the example computer network of FIG. 1 in which first and second MST clusters 310, 320 have been established within a MST region 330. Network nodes sw2 to sw9 120-155 are arranged into a MST region 330. Within the MST region 330, a plurality of MSTIs may be established. Nodes sw4 130, sw5 135 and sw6 140, in this example, are arranged into a first MST cluster 310, with links sw4-sw6, sw4-sw5 and sw5-sw6 serving as intra-cluster links. Links sw0-sw4, sw2-sw4, sw2-sw6, sw4-sw7 and sw6-sw8 serve as inter-cluster links, and couple the first MST cluster 310 to external nodes. The first MST cluster 310 is presented to external nodes as a single logical entity, and internal traffic sourced and destined for network nodes within the first MST cluster 310 is contained therein.

Similarly, nodes sw7 145, sw8 150 and sw9 155, in this example, are arranged into a second MST cluster 320, with links sw7-sw8, sw7-sw9 and sw8-sw9 serving as intra-cluster links. Links sw1-sw7, sw3-sw7, sw3-sw8, sw4-sw7 and sw6-sw8 serve as inter-cluster links, and couple the second MST cluster 320 to external nodes. Like the first MST cluster 310, the second MST cluster 330 is presented to external nodes as a single logical entity, and internal traffic sourced and destined for network nodes within the second MST cluster 320 is contained therein.

Since nodes within the first and second MST clusters 310, 320, and the rest of the MST region 330, have consistent MST configurations (i.e., share the same MST region name, revision number and MST configuration table) per-MSTI load balancing may occur across the boundaries of the MST clusters. That is, differing MSTIs of the MST region 330 may utilize different ones of the inter-cluster links, and frames associated with different MSTIs, may travel over different ones of the inter-cluster links. For example, per-MSTI load balancing may permit load balancing between inter-cluster links sw2-sw4 and sw2-sw6, through association of some VLANs with an MSTI that utilizes inter-cluster link sw2-sw4 and blocks inter-cluster link sw2-sw6, and other VLANs with an MSTI that utilizes inter-cluster link sw2-sw6 and blocks link inter-cluster sw2-sw4. In this manner, load balancing may be permitted across cluster boundaries, while MST clusters still present an appearance to external devices of a single logical entity.

Figure 4:
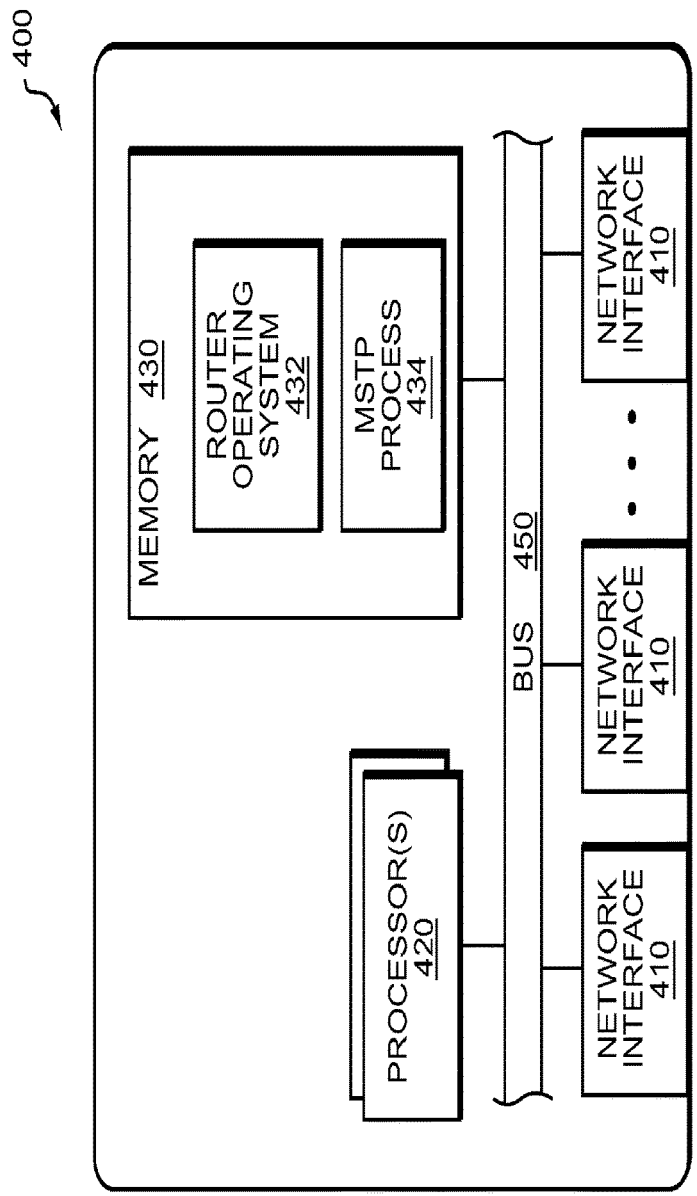
FIG. 4 is a schematic block diagram of an example network node, which is representative of the network nodes shown in FIGS. 1-3, and whose components may be used with the techniques for implementing MST clusters described herein.

FIG. 4 is a schematic block diagram of an example network node (e.g., a bridge or switch) 400, which is representative of the network nodes 110-155 and 210-280 shown in FIGS. 1-3, and whose components may be used with the techniques for implementing MST clusters described herein. The example network node 400 includes a plurality of network interfaces 410, processor(s) 420, and a memory 430 interconnected by a system bus 450. The network interfaces 410 contain the mechanical, electrical, and signaling circuitry for communicating over links. The memory 430 includes a plurality of storage locations for storing software and data structures, including software and data structures. The processor(s) 420 include logic configured to execute the software and manipulate data from the data structures. An operating system 432, portions of which are resident in memory 430 and executed by the processor(s) 420, functionally organizes the network node 400. A MSTP process 434 may interact with the operating system 432 to implement, for example, aspects of IEEE Std. 802.1Q-2005 MSTP, as well as the novel techniques for adding an additional level of hierarchy (i.e. MST clusters) to MST regions discussed herein.

Figure 5:
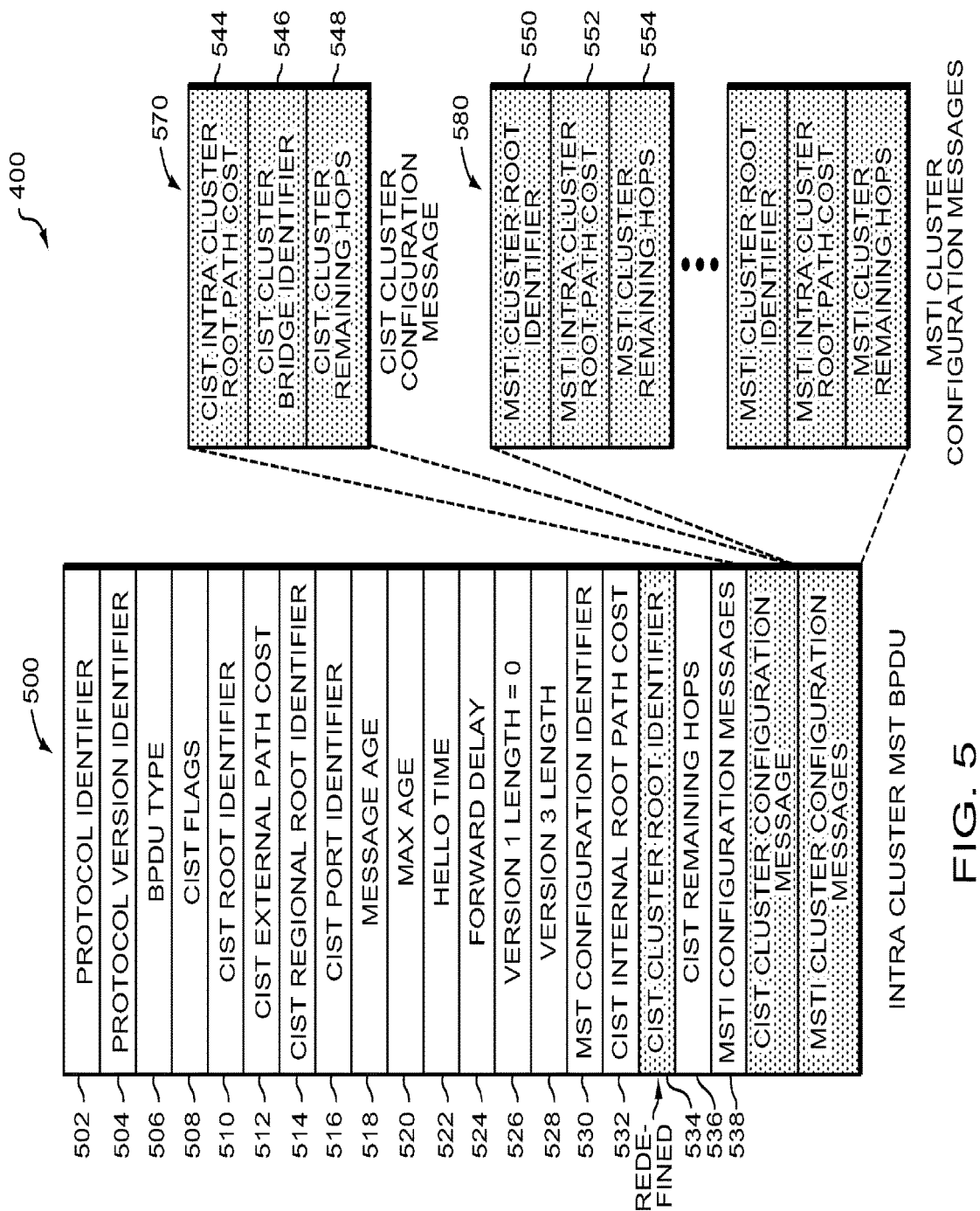
FIG. 5 is a schematic block diagram of an intra-cluster MST BPDU that may be propagated between nodes within the same MST cluster to implement certain of the techniques described herein.

FIG. 5 is a schematic block diagram of an intra-cluster MST BPDU 500 that may be propagated between nodes within the same MST cluster to implement certain of the techniques described herein. An intra-cluster MST BPDU 500 is intended to be propagated only within a MST cluster, and should not knowingly be forwarded across a cluster boundary. However, as discussed below, certain properties of the intra-cluster MST BPDU may permit interoperability with nodes running legacy MST implementations, which may not be aware of MST clusters or their respective boundaries.

A number of the fields within the intra-cluster MST BPDU 500 may be identical, or otherwise similar, to those within an IEEE Std. 802.1Q-2005 MSTP BPDU, and accordingly will be familiar to those skilled in the art. For example, a Protocol Identifier field 502, a Protocol Version Identifier field 504, a BPDU Type field 506, a CIST Flags field 508, a CIST Root Identifier field 510, a CIST External Path Cost field 512, a CIST Regional Root Identifier field 514, a CIST Port Identifier filed 516, a Message Age field 518, a Max Age field 520, a Hello Time field 522, a Forward Delay filed 524, a Version 1 Length filed 526, a Version 3 Length field 528, a MST Configuration Identifier field 530, a CIST Internal Root Path Cost field 532, a CIST Remaining Hops field 536, and one or more MSTI configuration Messages 532, may be identical, or otherwise similar, to those within a IEEE Std. 802.1Q-2005 MSTP BPDU. In the interest of brevity, the requirements and functions of such fields are not described in detail herein, and only fields that have been redefined, or newly introduced, as compared to an IEEE 802.1Q-2005 MSTP BPDU, are described in detail below.

Following a CIST Internal Root Path Cost field 532, an IEEE 802.1Q-2005 MSTP BPDU typically would include a CIST Bridge Identifier field to indicate the bridge identifier of the node that transmitted the BPDU. In order to present an MST cluster as a single logical entity, such field may be redefined to operate as a CIST Cluster Root Identifier field 534, to store the bridge identifier of a node of the cluster (i.e. a CIST cluster root node) that has the lowest cost path to the CIST regional root node. For example, referring to FIG. 3, node sw4 130 may serve as the CIST cluster root node. In which case, nodes sw4 130, sw5 135 and sw6 140 would each generate intra-cluster MST BPDUs 500 that include the bridge identifier of node sw4 130 in their CIST Cluster Root Identifier field 534.

Typically, an IEEE 802.1Q-2005 MSTP BPDU would terminate after one or more MSTI Configuration Messages 538. To implement the techniques described herein, a new CIST Cluster Configuration Message 570 may be inserted after the one or more MSTI Configuration Messages 538. Since the CIST Cluster Configuration Message 570 is located after the MSTI Configuration Messages 538, it will be beyond the length typically indicated in the Version 3 Length field 528. This may advantageously permit interoperation with nodes that are running certain legacy MSTP implementations, which would typically ignore information beyond the length indicated in the Version 3 length field.

The CIST Cluster Configuration Message 570 may include a CIST Intra Cluster Root Path Cost field 544, a CIST Cluster Bridge Identifier filed 546, and a CIST Cluster Remaining Hops field 548.

The CIST Intra Cluster Root Path Cost field 544 stores a cost within the cluster to reach the CIST cluster root node. For example, referring to FIG. 3, if node sw6 140 generated the Intra Cluster MST BPDU 500, and node sw4 130 is the CIST cluster root node, the CIST Intra Cluster Root Path Cost field 544 would store a cost between node sw4 130 and node sw6 140.

The CIST Cluster Bridge Identifier field 546 stores the bridge identifier of the node that generated the Intra Cluster MST BPDU 500. For example, referring to FIG. 3, if node sw6 140 generated the Intra Cluster MST BPDU 500, its bridge identifier would be included in the CIST Cluster Bridge Identifier field 546.

The CIST Cluster Remaining Hops field 548 stores a number of hops within the MST cluster which limits the propagation and longevity of received spanning tree information for the CIST.

Following the CIST Cluster Configuration Message 570, one or more MSTI Cluster Configuration Messages 580, corresponding to the cluster described in the CIST Cluster Configuration Message 570, may be included to provide information about respective MSTIs supported by the MST cluster. As with the CIST Cluster Configuration Message 570, the MSTI Cluster Configuration Messages 580 are beyond the length typically indicated in the Version 3 Length field 528 and thus will typically be ignored by legacy MSTP implementations.

Each such message 570 may be similar to a MSTI Configuration Message 538, but instead contain MST cluster specific information. A MSTI Cluster Configuration Message may include a MSTI Cluster Root Identifier field 550, a MSTI Intra Cluster Root Path Cost field 552, and a MSTI Cluster Remaining Hops field 554.

The MSTI Cluster Root Identifier field 550 stores the bridge identifier of a node of the cluster serving as a root node of the cluster for the respective MSTI. For example, referring to FIG. 3, node sw6 140 may serve as the root node of the cluster for one MSTI, and node sw4 140 may serve as the root node of the cluster for another MSTI. In each such case, the respective node's bridge identifier may be stored in the MSTI Cluster Root Identifier field 550.

The MSTI Intra Cluster Root Path Cost field 552 stores a cost within the cluster to reach the cluster root node for the respective MSTI. For example, referring to FIG. 3, if node sw4 130 generated the Intra Cluster MST BPDU 500, and node sw4 130 is the cluster root node for the respective MSTI, the MSTI Intra Cluster Root Path Cost field 552 would store a cost between node sw6 140 and node sw4 130.

The MSTI Cluster Remaining Hops field 554 stores a number of hops within the MST cluster which limits the propagation and longevity of received spanning tree information for the respective MSTI.

The above discussed intra-cluster MST BPDU 500 may be limited in size due to Ethernet frame size limits, such that, a intra-cluster MST BPDU 500 may consume no more than about 1500 bytes. As such, a single intra-cluster MST BPDU 500 may be limited to contain information for at most 32 different MSTIs, in addition to the CIST. If more MSTIs are configured, multiple intra-cluster MST BPDUs may be utilized to describe the network configuration.

The information contained in BPDUs, and that is used to select root nodes and shortest paths by a spanning tree protocol, is typically referred to a "spanning tree priority vector." Spanning tree priority vectors provide a basis for a concise specification of a protocol's computation of the active topology. In IEEE 802.1Q-2005 MSTP, the CIST priority vector consists of a) root identifier (RootID) (i.e., the bridge identifier of the CIST root node), b) external root path cost (ExtRootPathCost) (i.e., the path cost between MST Regions from the transmitting Bridge to the CIST Root), c) regional root identifier (RRootID) (i.e., the bridge identifier of the CIST regional root node), d) internal root path cost (IntRootPathCost) (i.e., the path cost to the CIST regional root node), e) designated bridge identifier (DesignatedBridgeID) (i.e., the bridge identifier for the transmitting node for the CIST), f) Designated Port Identifier (DesignatedPortID) (i.e., the Port Identifier for the transmitting port for the CIST) and g) the BPDU-receiving port ID (RcvPortID) which is not conveyed in BPDUs, but used as a tie-breaker between otherwise equal priority vectors within a receiving node. To implement the additional level of hierarchy as described herein, the IEEE 802.1Q-2005 MSTP CIST priority vector may be modified. A cluster root identifier (CRootID) (i.e., the bridge identifier of the CIST cluster root node) and an intra-cluster root path cost (IntraRootPathCost) (i.e., the path cost to the CIST cluster root node) may be added to the priority vector. Accordingly, a complete CIST priority vector that supports MST clusters may be defined as: root identifier (RootID), b) external root path cost (ExtRootPathCost), c) regional root identifier (RRootID), d) internal root path cost (IntRootPathCost), e) cluster root identifier (CRootID), f) intra-cluster root path cost (IntraRootPathCost), g) designated bridge identifier (DesignatedBridgeID), h) Designated Port Identifier (DesignatedPortID) and i) the BPDU-receiving port ID (RcvPortID). It should be understood that external root path cost (ExtRootPathCost) is updated across MST region boundaries, internal root path cost (IntRootPathCost) is updated across MST cluster boundaries, but not within a MST cluster, and intra-cluster root path cost (IntraRootPathCost) is updated within a MST cluster.

Similarly, in IEEE 802.1Q-2005 MSTP, the MST priority vector consists of a) regional root identifier (RRootID) (i.e., the bridge identifier of the MSTI regional root for this particular MSTI in this MST region), b) internal root path cost (IntRootPathCost) (i.e., the path cost to the MSTI Regional Root for this particular MSTI in this MST region), c) designated bridge identifier (DesignatedBridgeID) (i.e., the bridge identifier for the transmitting node for this MSTI), d) Designated Port Identifier (DesignatedPortID) (i.e., the port identifier for the transmitting port for this MSTI) and e) receiving port identifier (RcvPortID), which is not conveyed in BPDUs, but used as tie-breaker between otherwise equal priority vectors within a receiving node. To implement the additional level of hierarchy as described herein, the IEEE 802.1Q-2005 MST priority vector may be modified. A cluster root identifier (CRootID) (i.e., the bridge identifier of the cluster root node for this MSTI) and an intra-cluster root path cost (IntraRootPathCost) (i.e., the path cost to the cluster root node for this MSTI) are added to the priority vector. Accordingly, a complete MST priority vector that supports MST clusters may be defined as: a) regional root identifier (RRootID), b) internal root path cost (IntRootPathCost), c) cluster root identifier (CRootID), d) intra-cluster root path cost (IntraRootPathCost), e) designated bridge identifier (DesignatedBridgeID), f) Designated Port Identifier (Designated-PortID) and f) receiving port identifier (RcvPortID).

Figure 6:
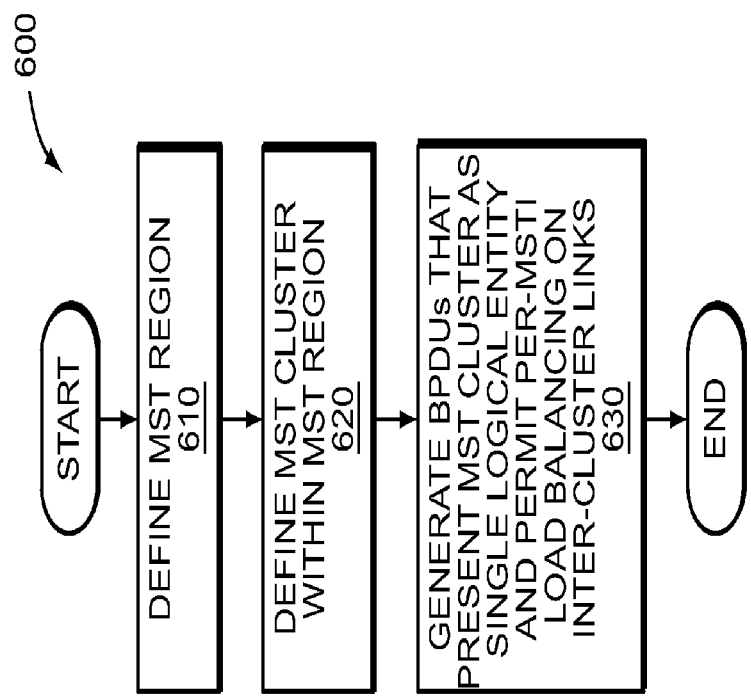
FIG. 6 is a flow diagram of an example sequence of steps for implementing MST clusters within a network.

FIG. 6 is a flow diagram of an example sequence of steps 600 for implementing MST clusters within a network. Such sequence of steps may be implemented, at least in part, by MSTP process 434, working in conjunction with the operating system 432, when their instructions are executed on processor(s) 220. At step 610 a multiple spanning tree (MST) region is defined that includes a plurality of network nodes interconnected by links. At step 620, a MST cluster is defined within the MST region, where the MST cluster includes a plurality of network nodes selected from the plurality of network nodes of the MST region. At step 630, MST BPDUs are generated that present the MST cluster as a single logical entity to network nodes of the MST region that are not included in the MST cluster, yet enables per-MSTI load balancing of traffic across inter-cluster links that connect network nodes included in the MST cluster and network nodes of the MST region that are not included in the MST cluster. Specifically, the BPDUs may include a CIST Cluster Root Identifier field 534, that stores the bridge identifier of a node of the cluster that has the lowest cost path to CIST regional root node; may include one or more MSTI Configuration Messages 570, that indicate a CIST intra cluster root path cost, a CIST cluster bridge identifier, and a CIST cluster remaining hops count; and may include one or more corresponding MSTI Cluster Configuration Messages 580, that indicate a MSTI cluster root identifier, MSTI intra cluster root path cost, and a MSTI cluster remaining hops count. Further, by specification of consistent MST configurations (i.e., the same MST region name, revision number and MST configuration table), per-MSTI load balancing may be provided across inter-cluster links.

In summary, the present disclosure provides an additional level of hierarchy, (MST clusters) within a MST environment. A MST cluster includes a set of nodes selected from the nodes of a MST region. A MST cluster is presented within BPDUs as a single logical entity. Internal traffic that is sourced and destined for network nodes of the MST cluster is contained within the MST cluster, and passed over intra-cluster links. Since nodes within the MST cluster and the rest of the MST region may have consistent MST configurations, per-MSTI load balancing may occur across the boundary of the MST cluster. In this manner, external traffic that is sourced from, or destined for, nodes of the MST region located external to MST cluster may be load balanced across inter-cluster links.

It should be understood that various adaptations and modifications may be made within the spirit and scope of the embodiments herein. For example, at least some of the above-described embodiments may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example. It is the object of the appended claims to cover all such variations and modifications as come within the true spirit and scope of the embodiments herein.

What is claimed is:

1. A method comprising:
defining a multiple spanning tree (MST) region in a network, the MST region comprising a plurality of network nodes interconnected by links;
defining a plurality of non-overlapping MST clusters within the MST region, each of the MST clusters being a subset of at least two of the plurality of network nodes within the MST region, each of the MST clusters presenting itself as a single logical entity and permitting traffic on a plurality of inter-cluster links associated with the subset of the plurality of network nodes; and
enabling load balancing of traffic across the plurality of inter-cluster links, each link of the plurality of inter-cluster links connecting a respective network node in one of the MST clusters to a respective network node of the MST region that is outside of the one of the MST clusters.

2. The method of claim 1, further comprising: including a bridge identifier of a network node of the one of the MST clusters that has a lowest cost path to a Common and Internal Spanning Tree (CIST) regional root node in one or more MST bridge protocol data units (BPDUs).

3. The method of claim 2, wherein the bridge identifier of the network node of the one of the MST clusters that has the lowest cost path to the CIST regional root node is stored in a CIST Cluster Root Identifier field of the one or more MST BPDUs.

4. The method of claim 1, further comprising:
including a cost within the one of the MST clusters to reach a Common and Internal Spanning Tree (CIST) cluster root node in one or more MST bridge protocol data units (BPDUs).

5. The method of claim 4, wherein the cost within the one of the MST clusters to reach the CIST cluster root node is stored in a CIST Intra Cluster Root Path Cost field of a CIST Cluster Configuration Message in the one or more MST BPDUs.

6. The method of claim 1, further comprising:
generating, by one or more processors, one or more MST bridge protocol data units (BPDUs) that present the one of the MST clusters as a single logical entity to network nodes of the MST region that are not included in the MST cluster; and
including a respective bridge identifier of a particular network node that generated the MST BPDUs in the one or more MST BPDUs.

7. The method of claim 6, wherein the particular network node that generated the MST BPDUs is stored in a MSTI Cluster Root Identifier field of a MSTI Cluster Configuration Message in the one or more MST BPDUs.

8. The method of claim 1, further comprising:
including a number of hops within the one of the MST clusters for a Common and Internal Spanning Tree (CIST) in one or more MST bridge protocol data units (BPDUs).

9. The method of claim 8, wherein the number of hops within the one of the MST clusters for the CIST is stored in a CIST Cluster Remaining Hops field of a CIST Cluster Configuration Message in the one or more MST BPDUs.

10. The method of claim 1, further comprising:
including a respective bridge identifier of a particular node of the one of the MST clusters serving as a root node of the one of the MST clusters for a respective MSTI in one or more MST bridge protocol data units (BPDUs).

11. The method of claim 10, wherein a cost within the one of the MST clusters to reach the root node associated with the respective MSTI cluster is stored in a MSTI Cluster Root Identifier field of a MSTI Cluster Configuration Message in the one or more MST BPDUs.

12. The method of claim 1, further comprising:
including a cost within the one of the MST clusters to reach a cluster root node for a respective MSTI in one or more MST bridge protocol data units (BPDUs).

13. The method of claim 12, wherein the cost within the one of the MST clusters to reach the cluster root node for the respective MSTI is stored in a MSTI Intra Cluster Root Path Cost field of a MSTI Cluster Configuration Message in the one or more MST BPDUs.

14. The method of claim 1, further comprising:
including a number of hops within the one of the MST clusters for a respective MSTI in one or more MST bridge protocol data units (BPDUs).

15. The method of claim 14, wherein the number of hops within the one of the MST clusters for the respective MSTI is stored in a MSTI Cluster Remaining Hops field of a MSTI Cluster Configuration Message in the one or more MST BPDUs.

16. The method of claim 14, wherein the one or more MST BPDUs are intra cluster MST BPDUs.

17. An apparatus comprising:
a network interface configured to couple the apparatus to one or more network nodes of a network;
a processor coupled to the network interface and configured to execute one or more processes; and
a memory configured to store a multiple spanning tree protocol (MSTP) process executable by the processor, the MSTP process when executed operable to:
determine a multiple spanning tree (MST) region has been defined in the network, wherein the MST region comprises a plurality of network nodes interconnected by links;
determine a plurality of non-overlapping MST clusters within the MST region, each of the MST clusters being a subset of at least two of the plurality of network nodes within the MST region, wherein each of the MST clusters presenting itself as a single logical entity and permits traffic on a plurality of inter-cluster links associated with the subset of the plurality of network nodes; and
enable load balancing of traffic across the plurality of inter-cluster links, each link of the plurality of inter-cluster links connecting a respective network node in one of the MST clusters to a respective network node of the MST region that is outside of the one of the MST clusters.

18. The apparatus of claim 17, wherein a bridge identifier is stored in a Common and Internal Spanning Tree (CIST) Cluster Root Identifier field of one or more MST bridge protocol data units (BPDUs), wherein a CIST Cluster Configuration Message in the one or more MST BPDUs comprises a CIST Intra Cluster Root Path Cost field containing a value representing a cost within the one of the MST clusters to reach a Common and Internal Spanning Tree (CIST) cluster root node in the one or more MST BPDUs.

19. The apparatus of claim 17, wherein one or more MST bridge protocol data units (BPDUs) comprise a number of hops within the one of the MST clusters for a Common and Internal Spanning Tree (CIST) regional root node.

20. A non-transitory computer-readable storage medium comprising:
computer-executable instructions stored thereon which, when executed by one or more processors, cause the one or more processors to:
define a multiple spanning tree (MST) region in a network, the MST region comprising a plurality of network nodes interconnected by links;
define a plurality of non-overlapping MST clusters within the MST region, each of the MST clusters being a subset of at least two of the plurality of network nodes within the MST region, each of the MST clusters presenting itself as a single logical entity and permitting traffic on a plurality of inter-cluster links associated with a subset of the plurality of network nodes; and
enable load balancing of traffic across the plurality of inter-cluster links, each link of the plurality of inter-cluster links connecting a respective network node in one of the MST clusters to a respective network node of the MST region that is outside of the one o the MST clusters.

* * * * *